United States Patent Office 3,305,322
Patented Feb. 21, 1967

3,305,322
VANADIUM RECOVERY PROCESS EMPLOYING
SO₂ GAS AS THE OXIDIZER
Angus V. Henrickson, Golden, Colo., assignor to Hazen Research Inc., Golden, Colo., a corporation of Colorado
No Drawing. Filed Dec. 23, 1963, Ser. No. 332,936
13 Claims. (Cl. 23—322)

This invention relates to a new process for the recovery of vanadium; more particularly, it relates to a new method for the oxidation of vanadium for recovery purposes.

The invention is illustrated herein by its application to the oxidation of vanadium to its highest valence state for recovery from its ores, and particularly, for recovery from leach and strip liquor solutions. However, the invention is not limited to this application as it is applicable to the oxidation of vanadium for recovery purposes irrespective of the type of solution in which it exists.

Vanadium is marketed almost exclusively as the oxide vanadium pentoxide in which the metal has a valence of 5. This is largely because $V_2O_5$ is an insoluble compound and conveniently recovered as such. Accordingly, practically all methods for its recovery include the step of oxidizing vanadium to the +5 state to permit its recovery as $V_2O_5$.

Uranium and vanadium commonly exist together in ores, such as, carnotite, or vanadium exists in ores in which no uranium is present. In recovering vanadium from both types of ores, the ore is leached with sulfuric acid to dissolve vanadium in the +4 valence state and the solution separated from the solid barren gangue material. If a uranium-bearing ore is being treated, the uranium is selectively recovered by ion exchange or solvent extraction. The vanadium-containing solution in either case also contains impurities such as iron, aluminum and other soluble ore constituents. The solutions from direct leaching to dissolve vanadium, or acid tailings from uranium processing which contain vanadium are essentially identical. In each case, a major part of the vanadium exists in the +4 valence state and regardless of the method used for its recovery from solution, an oxidation step must be performed before it can be recovered as $V_2O_5$.

The preferred method today for recovering vanadium from leach liquors is by solvent extraction with an alkyl phosphoric acid compound, such as, alkyl phosphoric acid, dissolved in an appropriate diluent such as kerosene. Vanadium is extracted by the solvent as an organic soluble +4 vanadium alkyl phosphate complex. The pH of the solution is maintained at 1.5–2.0 because this is the most favorable range for extraction of plus 4 vanadium. The chief disadvantage of this process is the fact that ferric iron dissolved in the liquor is extracted by alkyl phosphoric acid solvents under the same conditions as vanadium, and contaminates the vanadium product as well as seriously impairs the efficiency of the solvent in terms of vanadium capacity. To prevent the interference of ferric iron with the recovery process, it is necessary to reduce it to the ferrous state with a reducing agent such as metallic iron prior to extraction. After extraction, vanadium is ordinarily stripped from the solvent with a 10–15 percent solution of sulfuric acid and recovered from the sulfuric acid solution by oxidation to the +5 valence state followed by pH adjustment to about 1 and heating to precipitate a hydrated vanadium oxide. There are a number of variants to the recovery process after extraction, but in all of them the vanadium is oxidized to the +5 state before recovery as vanadium pentoxide.

Another method for recovering vanadium from acid leach liquors or uranium tailings is based on the precipitation of vanadium as ferric vanadate. The precipitation is made by oxidizing the vanadium to the +5 state, adjusting the acidity to a pH at which ferric vanadate will precipitate and heating to near boiling. The pH used is normally above about 1.5 but this will depend upon the amount of iron present. Iron is separated from the precipitated ferric vanadate by heating the precipitate at elevated temperatures with a basic solution such as sodium carbonate or sodium hydroxide, or roasted with sodium carbonate or sodium chloride to convert the vanadium to soluble sodium vanadate, leaving the iron undissolved as hydrated ferric oxide. The last step for the recovery or vanadium is essentially like that described for the process above, i. e., the solution is acidified to about pH 1 and heated to precipitate the vanadium as vanadium oxide.

In both of the procedures described above, the final step is drying and fusing the vanadium oxide in a furnace at high temperature. The melt is then discharged on a cooling plate to form dense black flakes which is the common item of commerce known as "black flake."

Both of the methods described above employ an oxidation step and this is one of the largest items of chemical cost. The least expensive of the commercially available oxidants in terms of cost per equivalent weight is sodium chlorate. Stoichiometrically, 0.22 lb. sodium chlorate per lb. $V_2O_5$ is required and greater amounts are required if other oxidizable materials are present in solution. The total cost of sodium chlorate necessary for the oxidation step is relatively high.

It would be highly advantageous to provide a method using a solvent extraction or ion exchange procedure which permits extraction of vanadium in the presence of ferric iron. It is known that certain amines will extract +5 vanadium in the presence of ferric iron. Amines which may be used are represented by those disclosed in U.S. Patents 2,877,250 and 2,455,019. Preferred amines are the tri-capryl and the tri-lauryl amines. However, the use of oxidizing agents such as sodium chlorate to effect the oxidation results in contamination and loss of efficiency of the solvent extraction or ion exchange agent. More important, the use of amine and other extractants to extract +5 vanadium has not been practical because oxidation of the vanadium prior to extraction in a solution containing other oxidizable materials has been too expensive. Prior attempts to find a cheapter oxidation process for vanadium have included the use of $SO_2$ in procedures similar to those used for oxidizing uranium as disclosed in U.S. Patent 2,863,716. For various reasons these attempts have met with failure.

Liquors which contain relatively low concentrations of vanadium (less than 0.5 g. $V_2O_5$ per liter) are being discarded because it is uneconomical to process them for the recovery of vanadium by present methods. In most instances, the reduction of ferric iron prior to vanadium recovery by extraction with alkyl phosphates is the prohibitive cost item.

Accordingly, it is an object of this invention to provide an improved process for the oxidation of vanadium which is more economical than present processes.

It is another object of this invention to provide a method for the recovery of vanadium from its ores which is more economical than prior art methods.

It is a further object of the invention to provide an economical method for the oxidation of vanadium in the recovery from its ores so that it can be recovered as $V_2O_5$.

It is still another object of this invention to provide a method for the recovery of vanadium with amine solvents from leach solutions containing ferric iron.

It is another object of this invention to provide a method for recovery of vanadium from low-grade ores which is economically feasible.

It has been found that the above and other objectives can be accomplished by an improved process for the oxidation of vanadium in solution in which the solution is treated with sulphur dioxide and an oxygen-containing gas such as air, in the presence of iron. Sulphur dioxide may be added in gaseous form or as sulphurous acid.

Oxidation of vanadium in solution can be accomplished inexpensively with air with the use of techniques which provide good gas and liquid contact. It is required that a small amount of $SO_2$ be introduced with the air stream or into the solution and that the solution contain iron as a catalyst. A preferred pH range for the aeration process is between about 1 and 3. The air and $SO_2$ are introduced by conventional means. Waste gases containing oxygen, as well as other oxygen-containing gases can, of course, be used. Oxygen alone in combination with sulphur dioxide can be used but, of course, the cost is considered prohibitive for most applications.

The time over which the air and $SO_2$ are introduced is, of course, not critical; however, increase in the rate of introduction up to a certain point will increase the speed of the oxidation. The oxidation can be performed at room temperatures.

The ratio of $SO_2$ to oxygen containing gas must be maintained below a maximum as too large a ratio will permit the $SO_2$ to act as a reducing agent. The upper mole percent of $SO_2$ when used with air is about 7 and 8 mole percent. At concentrations greater than about 3 mole percent oxidation is incomplete. The lower limit of the range is governed by what is practicable, as minute amounts of $SO_2$ are operative; however the rate decreases proportionally.

Likewise, the amount of iron present as a catalyst is not critical; however, it has been found that an amount of about 50 mg. per liter and above is preferred in actual practice.

The application of the process to the recovery of vanadium from its ores is as follows. The ore is crushed and ground to the required fineness and digested with sulfuric acid by conventional milling techniques. The solution containing the dissolved vanadium in the +4 valence state is then separated from the solid barren gangue material by filtration or countercurrent decantation to produce a clear liquor which contains, in addition to vanadium, impurities such as iron, aluminum, and other soluble ore constituents. The same general dissolving method is applicable if the ore contains uranium. If the ore contains uranium, this metal is selectively recovered by conventional methods, such as ion exchange or solvent extraction methods, and vanadium is left in solution along with impurities. Air is bubbled vigorously through the leach solution with addition of $SO_2$ and incremental replenishment of $SO_2$ by addition of 6 percent sulfurous acid solution at a rate such that the mol ratio of $SO_2$ to air is less than 3:100. The pH of the solution is maintained below the precipitation point of ferric vanadate and when the vanadium has all been oxidized to the +5 state, it is extracted with tri-capryl amine solvent and stripped with a base such as ammonium or sodium hydroxide, or sodium carbonate. The pH of the strip solution is then adjusted to about 1 and heated to precipitate vanadium as hydrated $V_2O_5$ in the conventional manner. Alternative precipitations well known to the art can be used, such as the precipitation of vanadium as ammonium vanadate or other saleable product.

In application of the process to recovery of vanadium by the prior art ferric vanadate precipitation described above, air and $SO_2$ in the presence of iron are again used to perform the oxidation rather than sodium chlorate. The pH of the solution is maintained within the precipitation range of ferric vanadate. Ordinarily, sufficient iron is present in the leach solution to catalyze the reaction.

The following example was conducted as a study of effective concentration of $SO_2$ for oxidation of vanadium in the presence of iron.

*Example I*

500 ml. of solvent extraction raffinate containing 1.5 grams of reduced vanadium expressed as $V_2O_5$ and approximately 0.75 gram of ferrous iron was used for the test. Air was bubbled vigorously through the solution at about 500 cc. per minute. $SO_2$ was added to the solution and replenished incrementally by addition of 6 percent sulfurous acid solution. The pH of the solution was maintained at about 1.5, this being below the precipitation point of ferric vanadate for this solution. Change in oxidation of iron and vanadium was followed by measurement of E.M.F. with a platinum electrode and a calomel reference electrode. The E.M.F. reading rose rapidly from −390 to −450, a point indicating complete oxidation of iron. Then the rate decreased significantly and tended to drop to a lower negative value on each addition of $SO_2$ and then gradually increased as the $SO_2$ was purged. At this point the method of $SO_2$ addition was changed so that the $SO_2$ was introduced in the air stream through an aspirating stirrer. A low concentration of $SO_2$ was introduced through the impeller by placing the mouth of a flask containing 6 percent $SO_2$ at the intake of the impeller. The E.M.F. then rose steadily to −790. At this point a sample of the solution was titrated potentiometrically with permanganate to determine the extent of oxidation. This indicated that the vanadium was 65 percent oxidized. This preliminary test was made without measurement of absolute $SO_2$ concentration or rate of air flow. However, it did show conclusively that iron is oxidized rapidly at relatively high $SO_2$ concentrations but that in order to oxidize vanadium, low concentrations of $SO_2$ are necessary.

The following test was made as a study of the effect of pH value on oxidation.

*Example II*

500 cc. of a solvent extraction raffinate containing 1.15 grams of reduced vanadium expressed as $V_2O_5$ and approximately 0.25 gram of ferric and ferrous iron per liter expressed as ferric iron was treated in a reactor with 3 mol percent $SO_2$ in air at a rate of 100 cc. per minute. The temperature was held constant at 50° C. and the acidity was held constant at pH 2.0. The oxidation was followed by E.M.F. measurement using a platinum electrode and a calomel reference electrode. In three hours the E.M.F. rose from −319 to −540. At an E.M.F. of −522, a slight precipitate of ferric vanadate started to form indicating conclusively that oxidation of vanadium was proceeding. At E.M.F. −540 the solution was checked quantitatively with dilute permanganate and showed that oxidation of vanadium was complete. The test was repeated using a pH of 1.5 with oxidation being completed after three hours.

The above tests indicate that complete oxidation can be obtained at pH 1.5 and 2.0. It was found that ferric vanadate precipitates from the raffinate at a pH of about 2 or above while if the pH was held below about 2 no ferric vanadate precipitated. If the solvent extraction procedure is used the pH must be held below about 2 in order to prevent the precipitation of ferric vanadate.

The following test was conducted to determine the effect of $SO_2$ concentration on oxidation.

*Example III*

One liter of tailings solution from a uranium recovery operation containing about 1.5 grams of reduced vanadium expressed as $V_2O_5$ and approximately 0.75 gram of ferrous and ferric iron per liter expressed as ferric iron was treated with 3.0 mol. percent $SO_2$ in air at 500 cc. per minute, at 50–60° C. The oxidation was followed by E.M.F. measurement with a platinum elecrode and a calomel reference electrode. After 90 minutes the E.M.F.

rose from −440 to −736. A check of the solution at this point showed no reduced vanadium was present in the solution. At this point different samples of the solution were tested with different concentrations of $SO_2$, holding at each concentration until the E.M.F. remained stable. The degree of oxidation was then estimated from the E.M.F. reading corrected to the pH of the control at 3.0 mol percent $SO_2$. These data are given in the following table.

| $SO_2$ concentration, mol percent | E.M.F. | Percent vanadium oxidized |
|---|---|---|
| 3.0 | 736 | 100 |
| 3.5 | 690 | 90 |
| 4.6 | 670 | 75 |
| 5.6 | 630 | 50 |
| 7.6 | 500 | 0 |

The above data indicates that the concenration of $SO_2$ at which no oxidation occurs is between 7 and 8 mol percent, and that in order to get complete oxidation the $SO_2$ cencentration must be less than about 3 to 3.5 mole percent.

The following test was run as a study of the lower limit of $SO_2$ concentration in the oxidation process.

*Example IV*

A test run was made using 350 ml. of a synthetic vanadium (IV) solution containing 100 mg. per liter of ferric iron. Air containing no $SO_2$ was bubbled through the solution at 350 cc. per minute at 50° C. The oxidation was followed by measurement of E.M.F. with a platinum electrode and a calomel reference electrode. After one hour no change in the E.M.F has occurred. Titration with permanganate verified the finding that no oxidation of vanadium had occurred. Sulphur dioxide was then introduced into the air stream at a concentration of 0.14 mol percent per liter. The E.M.F. started to rise. Samples were removed at intervals of one-half hour, one hour and two hours and titrated for oxidized vanadium. At one-half hour, one hour and two hours 9.4 percent, 28 percent, and 47 percent, respectively, of the vanadium was oxidized.

This test indicated that oxidation will proceed with the use of incremental amounts of sulphur dioxide.

The following test was run to study the iron requirement for the oxidation process.

*Example V*

350 ml. of a synthetic vanadium (IV) solution containing no iron was used. 3 mol percent of $SO_2$ in air was bubbled through the solution at a rate of 350 cc. per minute at 50° C. The oxidation was followed by measurement of E.M.F. with a platinum electrode and a calomel reference electrode. The operation was continued for two hours and the vanadium oxidation then checked by titration with potassium permanganate. No oxidation of vanadium had occurred. At this point ferric iron was added to a concentration of 100 mg. per liter of solution. The E.M.F. immediately started to rise from −380 and leveled off at −640. The solution was then checked by titration with permanganate and it was found that all of the vanadium was oxidized.

This test indicates that the oxidation will not proceed without the presence of ferric iron. While incremental amounts of iron will produce some catalytic effect, amounts of 50 mg. per liter and above are preferred from a practical standpoint.

Methods for the recovery of vanadium from leach solutions once it has been oxidized to the +5 state are well known to the art and are illustrated by such methods in the prior art processes disclosed above. These methods are used with the oxidation process described herein to constitute a combined process for the recovery of vanadium from its ores.

The procedures described herein provide a new process for the oxidation of vanadium to its +5 state which is highly efficient and economical. The process makes possible the use of amine solvent extraction agents represented by those disclosed above for recovering vanadium from leach solutions in the presence of ferric iron. The low cost of the reagents used for oxidizing the vanadium makes the process economically attractive. The process is applicable to the recovery of vanadium from its ores or for reclaiming it from scrap metal, and is highly compatible with the recovery of vanadium as $V_2O_5$.

Although the invention has been illustrated and described with reference to the preferred embodiments thereof, it is to be understood that it is in no way limited to the details of such embodiments, but is capable of numerous modifications within the scope of the appended claims.

What is claimed is:

1. The process for the oxidation of vanadium in solution which comprises treating the solution with sulphur dioxide and a medium containing oxygen gas in the presence of ferric iron.

2. The process of claim 1 in which the medium containing oxygen gas is air.

3. The process of claim 2 in which the percentage of $SO_2$ in air extends up to about 7 mole percent.

4. The process of claim 3 in which the oxidation is performed at a pH between about 1 and about 3.

5. The process of claim 3 in which sulphur dioxide is added in the form of sulfurous acid.

6. The process for the recovery of vanadium from leach solutions of its ores which comprises oxidizing the vanadium to the plus five state with $SO_2$ and a medium containing oxygen gas in the presence of ferric iron, and recovering the vanadium in the plus five state.

7. The process of claim 6 in which the oxidation step is performed at a pH below the precipitation point of ferric vanadate, the vanadium in the plus five state is solvent extracted from the leach solution, stripped from the solvent and recovered from the strip solution as vanadium pentoxide.

8. The process of claim 6 in which the oxidizing step is conducted at a pH within the range for the precipitation of ferric vanadate, and vanadium is recovered from the ferric vanadate as $V_2O_5$.

9. The process of claim 6 in which the oxygen containing gas is air and sulphur dioxide is present in amounts extending up to about 7.5 mole percent.

10. The process of claim 9 in which sulphur dioxide is added in the form of sulphurous acid.

11. The process for the recovery of vanadium from material in which part of the vanadium exists in the +4 state which comprises: comminuting the material; leaching the material to form a leach solution of the vandium; contacting the leach solution with air and $SO_2$ in a ratio of not more than about 7 mole percent of $SO_2$ to air at a pH between 1 and 3 in the presence of ferric iron in solution to oxidize the vanadium to the +5 state; and recovering the vanadium in the +5 state.

12. The process for the recovery of vanadium from material in which at least part of the vanadium exists in the +4 state which comprises: comminuting the material; leaching the material to form a leach solution of the vanadium; contacting the leach solution with air and $SO_2$ in a ratio of not more than about 7 mole percent of $SO_2$ to air at a pH between about 1 and the precipitation point of ferric vanadate in the presence of ferric iron in solution to oxidize the vanadium to the +5 state; extracting the vanadium from the leach solution with an amine extractant; stripping the vanadium from the extractant; and recovering the vanadium in the +5 state.

13. The process of claim 12 in which the mole percent of $SO_2$ to air is between about 3 and about 5.

(References on following page)

References Cited by the Examiner

UNITED STATES PATENTS

| | | | |
|---|---|---|---|
| 1,540,154 | 6/1925 | Wittig | 23—19 |
| 1,733,700 | 10/1929 | Stevens et al. | 23—23 |
| 2,211,119 | 8/1940 | Hixson | 23—19 |
| 2,863,716 | 12/1958 | Thunaes et al. | |

FOREIGN PATENTS 157,555   1/1921   Great Britain.

CARL D. QUARFORTH, *Primary Examiner.*
BENJAMIN R. PADGETT, *Examiner.*
S. TRAUB, *Assistant Examiner.*